(12) United States Patent
Dowlatkhah et al.

(10) Patent No.: US 11,436,355 B2
(45) Date of Patent: *Sep. 6, 2022

(54) RULE BASED ACCESS TO VOLUNTARILY PROVIDED DATA HOUSED IN A PROTECTED REGION OF A DATA STORAGE DEVICE

(71) Applicant: Workday, Inc., Pleasanton, CA (US)

(72) Inventors: Sangar Dowlatkhah, Alpharetta, GA (US); Erie Lai Har Lau, Redmond, WA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/033,492

(22) Filed: Sep. 25, 2020

(65) Prior Publication Data

US 2021/0012023 A1    Jan. 14, 2021

Related U.S. Application Data

(63) Continuation of application No. 15/829,794, filed on Dec. 1, 2017, now Pat. No. 10,810,320.

(51) Int. Cl.
*G06F 21/62* (2013.01)
*H04L 9/40* (2022.01)
*G06V 20/00* (2022.01)

(52) U.S. Cl.
CPC ...... *G06F 21/6218* (2013.01); *G06F 21/6245* (2013.01); *G06V 20/00* (2022.01); *H04L 63/105* (2013.01)

(58) Field of Classification Search
CPC ............ G06F 21/6218; G06F 21/6245; G06K 9/00624; H04L 63/105
See application file for complete search history.

(56) References Cited

U.S. PATENT DOCUMENTS 8,239,916 B2 *  8/2012  Reeves ................... G06F 21/62
                                                              726/1
9,015,483 B2    4/2015  Baskaran
(Continued)

FOREIGN PATENT DOCUMENTS

WO    2011031011 A2    3/2011
WO    2012173189 A1    12/2012
(Continued)

OTHER PUBLICATIONS

Gui, Zhipeng, et al., A service brokering and recommendation mechanism for better selecting cloud services, PloS one, 2014, 9.8: e105297, http://journals.plos.org/plosone/article?id=10.1371/journal.pone.0105297.
(Continued)

*Primary Examiner* — Mohammed Waliullah
(74) *Attorney, Agent, or Firm* — Van Pelt, Yi & James LLP

(57) ABSTRACT

Structured access to volunteered private data disclosed. Access can be based on security and privacy constraint information (SPCI) that can be selected by the party volunteering the private data. The volunteered data can be stored in a protected portion of a public network. The SPCI can be correlated to the volunteered data. In response to receiving a request for access to the volunteered data, an attribute of the request can be determined to satisfy one or more rules related to the SPCI prior to facilitating access to a version of a portion of the volunteered data. The version of the portion of the volunteered data can be a redaction of the portion of the volunteered data. The version of the portion of the volunteered data can be aggregated with other portions of other volunteered data determined to satisfy corresponding SPCI related rules.

19 Claims, 10 Drawing Sheets

(56) References Cited

U.S. PATENT DOCUMENTS

| | | | |
|---|---|---|---|
| 9,576,480 | B1 | 2/2017 | Shoshan |
| 9,615,066 | B1 | 4/2017 | Tran et al. |
| 9,621,555 | B2 | 4/2017 | Odenheimer |
| 9,727,591 | B1 | 8/2017 | Sharma et al. |
| 9,734,281 | B2 | 8/2017 | Jiang et al. |
| 9,754,233 | B1 | 9/2017 | Hamouda |
| 10,032,037 | B1* | 7/2018 | Allen ............... G06F 21/62 |
| 10,165,007 | B2* | 12/2018 | Brennan ............ G06F 21/6245 |
| 2014/0019415 | A1 | 1/2014 | Barker et al. |
| 2015/0304707 | A1 | 10/2015 | Vadura et al. |
| 2015/0347542 | A1 | 12/2015 | Sullivan et al. |
| 2016/0028605 | A1 | 1/2016 | Gil et al. |
| 2016/0147975 | A1 | 5/2016 | Han et al. |
| 2017/0053242 | A1 | 2/2017 | Ayyaswami |
| 2017/0086230 | A1 | 3/2017 | Azevedo et al. |
| 2017/0207926 | A1 | 7/2017 | Gil et al. |
| 2017/0245095 | A1 | 8/2017 | Neves et al. |
| 2018/0189137 | A1* | 7/2018 | De Keyser ............ G06F 3/067 |

FOREIGN PATENT DOCUMENTS

| | | | |
|---|---|---|---|
| WO | 2014035432 | A2 | 3/2014 |
| WO | 2015068897 | A9 | 5/2014 |
| WO | 2016068811 | A1 | 5/2016 |
| WO | 2016129715 | A1 | 8/2016 |

OTHER PUBLICATIONS

Practical Guide to Hybrid Cloud Computing, Cloud Standards Customer Council, cloudcouncil.org, Feb. 2016, http://www.cloud-council.org/deliverables/CSCC-Practical-Guide-to-Hybrid-Cloud-Computing.pdf.

Mitton, Nathalie, et al., Combining Cloud and sensors in a smart city environment, EURASIP Journal on Wireless Communications and Networking, 2012, 2012:247. http://citeseerx.ist.psu.edu/viewdoc/download?doi=10.1.1.385.1089&rep=rep1&type=pdf.

Xu, Boyi, et al., Ubiquitous data accessing method in IoT-based information system for emergency medical services, IEEE Transactions on Industrial Informatics, 2014, 10.2: 1578-1586. http://metalab.uniten.edu.my/~azie/AllArt/10016%20-%202014%20-%20Boyi%20Xu%20-%20Ubiquitous%20Data%20Accessing%20Method%20in%20IoTBased%20Information%20System%20for%20Emergency%20Medical&20Services%20-%2006742577.pdf.

Geambasu, Roxana, et al., CloudViews: Communal Data Sharing in Public Clouds, HotCloud, 2009. https://www.usenix.org/legacy/event/hotcloud09/tech/full_papers/geambasu.pdf.

Grigoras, Dan, et al., The Distributed Mobile Cloud Supporting the Internet of Things, 14th International Symposium on Parallel and Distributed Computing, 2015.

Gaughan, Melissa, Privacy in the Smart City: Implications of Sensor Network Design, Law, and Policy for Locational Privacy, 2016, https://digital.lib.washington.edu/researchworks/bitstream/handle/1773/36511Gaughan_washington_0250O_16107.pdf, 2016.

Van Zoonen, Liesbet, Privacy concerns in smart cities, Government Information Quarterly, 2016, 33:472-480. http://www.sciencedirect.com/science/article/pii/S0740624X16300818.

Zhuhadar, Leyla, et al., The next wave of innovation and Review of smart cities intelligent operation systems, Computers in Human Behavior, 2017, 66: 273-281. https://www.sciencedirect.com/science/article/pii/S0747563216306574.

Kitchin, Rob, Getting smarter about smart cities: Improving data privacy and data security, Department of the Taoiseach on behalf of the Government Data Forum, Jan. 28, 2016 http://progcity.maynoothuniversity.ie/wp-content/uploads/2016/01/Smart-Cities-data-privacy-data-security.pdf.

Kahn, Zaheer, et al., Towards Cloud based Smart Cities Data Security and Privacy Management, In: International Workshop on Smart City Clouds: Technologies, Systems and Applications in conjunction with 7th IEEE/ACM Utility and Cloud Computing (UCC), London, UK: IEEE, Dec. 2014, 806-811. http://eprints.uwe.ac.Uk/23560/1/SCCTSA%20Paper%20-%20Post%20acceptance%20-%20version.pdf.

Gupta, et al. Smart cities: five smart steps to cybersecurity, https://www.pwc.com/us/en/cybersecurity/broader-perspectives/smart-cities.html, PWC, Last accessed on Jan. 16, 2018.

Vogt. Digital Traces: Massive Data for Public Good, http://urbanopus.net/portfolio/digital-traces/, Urban Opus, Last accessed on Jan. 16, 2018.

Garcia, Miguel, New Business Around Open Data, Smart Cities and Fiware, European Public Sector Information Platform, Apr. 2015, Topic Report No. 2015/04. http://www.investhorizon.eu/resources/documents/6/263232145-New-Businesses-Around-Open-Data-Smart-Cities-FIWARE.pdf.

Tomorrow's City Hall: Catalyzing the digital economy, Accenture Consulting, 2016. https://www.accenture.com/us-en/acnmedia/PDF-10/Accenture-HPS-Digi-Cities-WEB-US-R3-Tomorrows-City-Hall-US.pdf.

Badii, C., et al., Analysis and assessment of a knowledge based smart city architecture providing services APIs, Future Generation Computer Systems, Oct. 2017, 75:14-29 http://www.sciencedirect.com/science/article/pii/S0167739X17302273?via%3Dihub.

Taking Cities to the Next Level, Hitachi Insight Group, 2016, https://www.hitachivantara.com/en-us/pdf/solution-profile/hitachi-solution-profile-city-data-exchange.pdf.

Nelson, Patrick, Copenhagen to sell public and private city data via exchange marketplace, Network World, Jun. 7, 2016, https://www.networkworld.com/article/3079810/software/copenhagen-to-sell-public-and-private-city-data-via-exchange-marketplace.html.

Williams, Jake, Cloud essential for smart city data sharing and analytics, panel says, Statescoop, Jun. 13, 2017, http://statescoop.com/cloud-essential-for-smart-city-data-sharing-and-analytics-panel-says.

Kinney, Sean, The key role of cloud computing in a smart city, RCR Wireless News, Nov. 21, 2016 https://www.rcrwireless.com/20161121/telco-cloud/key-role-cloud-computing-smart-city-tag17.

Alemadi, Tareq, Cloud Computing Relation with Smart Cities, Mar. 4, 2014 https://www.slideshare.net/thalemadi/cloud-computing-31880226, Last accessed Jan. 16, 2018.

A Catalog of Civic Data Use Cases, Data-Smart City Solutions, Jul. 19, 2017 http://datasmart.ash.harvard.edu/news/article/how-can-data-and-analytics-be-used-to-enhance-city-operations-723.

The Smart City Data Marketplace: Contextual Data Streams for Digital Citizens and Businesses, Ericsson, Oct. 9, 2015, http://beta.451marketing.com/metratech/2015/10/09/the-smart-city-data-marketplace-2/.

Office Action dated Feb. 5, 2020 for U.S. Appl. No. 15/829,794, 28 pages.

Notice of Allowance dated Jun. 17, 2020 for U.S. Appl. No. 15/829,794, 36 pages.

* cited by examiner

RULE BASED ACCESS TO VOLUNTARILY PROVIDED DATA HOUSED IN A PROTECTED REGION OF A DATA STORAGE DEVICE

PRIORITY CLAIM

The subject patent application is a continuation of, and claims priority to, U.S. patent application Ser. No. 15/829,794, filed Dec. 1, 2017, and entitled "RULE BASED ACCESS TO VOLUNTARILY PROVIDED DATA HOUSED IN A PROTECTED REGION OF A DATA STORAGE DEVICE," the entirety of which application is hereby incorporated by reference herein.

TECHNICAL FIELD

The disclosed subject matter relates to permissive access to voluntarily provided data, and, more particularly, to enabling rule based access to voluntarily provided data, wherein the voluntarily provided data is stored in a protected region of a data storage device.

BACKGROUND

By way of brief background, analysis of content can facilitate identification of portions of the content containing target characteristics. As an example, a police cruiser can employ a camera system and dedicated software running on a computer of the police cruiser to capture still image content as the police cruiser is driven, whereby license plate information can be located among the still image content and can be extracted therefrom. As another example, content can comprise location data, for example, social media, digital photo/video metadata, call records, etc., and the location data that can be determined from the content to, for example, locate a person, identify communicable disease vectors, determine a frequency of visitation to a location, etc. However, much of this data analysis can tread on the privacy of entities associated with the content and/or aspects comprised in the content. As such, consideration for the privacy and security of entities associated with data is becoming of increasing importance as data generation continues to evolve and increase.

DETAILED DESCRIPTION

Figure 1:
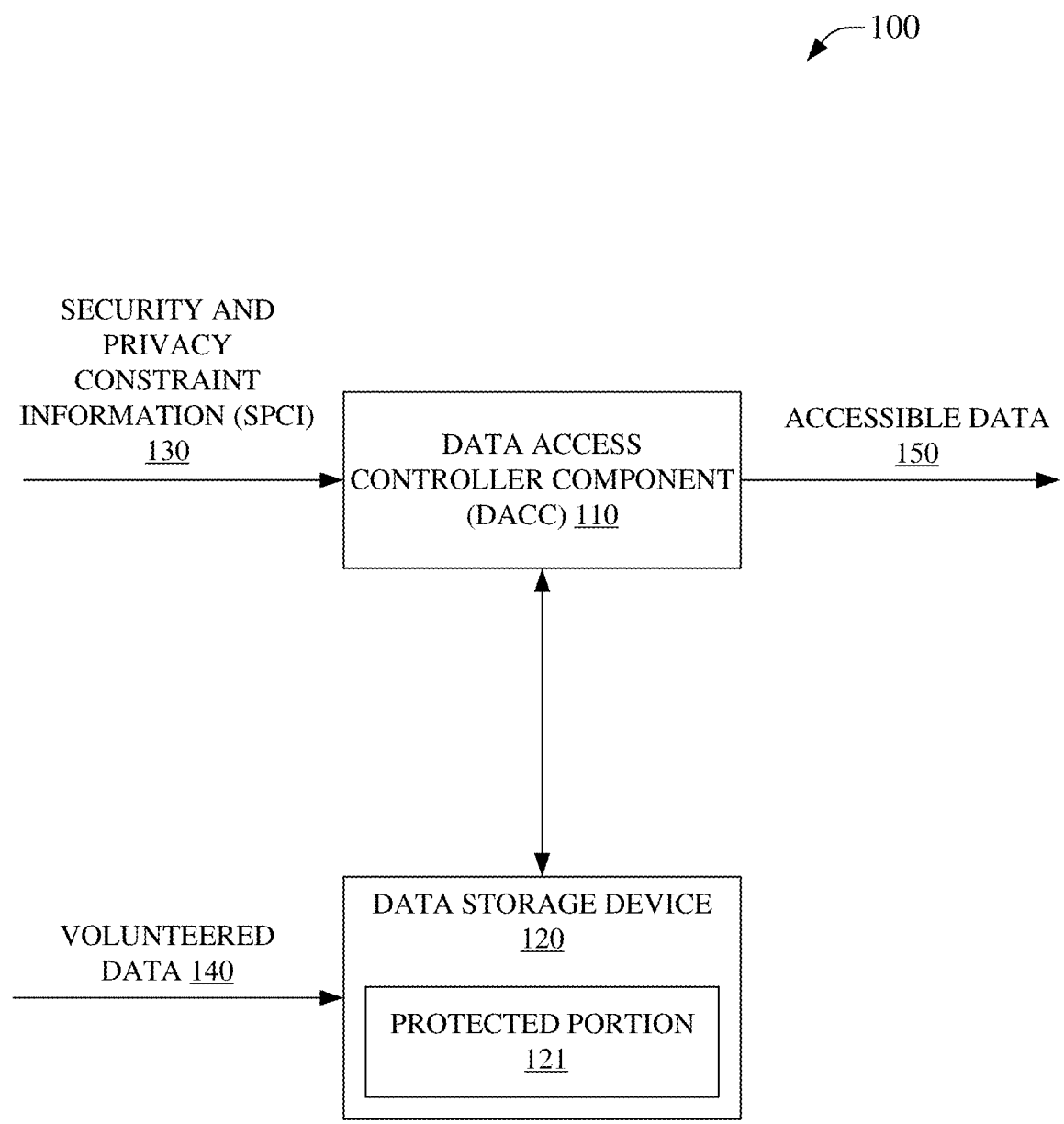
FIG. 1 is an illustration of an example system that can facilitate, based on security and privacy rules, access to voluntarily provided data stored on a protected region of a data store, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional access to private data stored on public data storage systems can be typically limited to either allowing full access to the data, or to not allowing any public access to the data. In contrast, the disclosed subject matter enables private data to be more easily volunteered for public consumption. In an aspect, in conventional technologies, volunteering private data for public consumption is associated with complete loss of control of the private data once it has been volunteered. However, the disclosed subject matter allows for volunteered private data, hereinafter 'volunteered data' or the like, to be stored in a protected manner on a public network and allows for structured access to the volunteered private data based on security and privacy constraint information (SPCI) that can be selected by the party volunteering the private data. The SPCI can be correlated to the volunteered data and the volunteered data can be stored in a protected portion of a public network. A request for access to the volunteered data can be received. The request can be associated with one or more attributes corresponding to the request. The attributes can be determined to satisfy one or more rules related to the SPCI prior to allowing access to a version of the volunteered data in response to the request for access. As an example, security camera content can be voluntarily stored on a protected area of a public network and correlated to SPCI indicating it is accessible only for law enforcement. Accordingly, a request for access to the security camera content from the local police can be granted, e.g., based on the request having an attribute indicating that the requestor is the local police department, which can satisfy the example SPCI rule. Similarly, a request for access by a local public school board can be denied where they are not a law enforcement agency.

Moreover, the rule based access disclosed can comprise hierarchical rules. In an aspect, rules can be global, e.g., affecting all volunteered data. In another aspect, rules can be individual, e.g., affecting specific portions of volunteered data. In a further aspect, more or less granular rules can be employed. Yet further, some, none, or all rules can be employed alone or in combination. As an example, a global SPCI rule can indicate that all volunteered data is only accessible for non-commercial purposes, a local SPCI rule can allow access to a first video file only to a designated list of family members, and a class level SPCI rule can allow access to the a mobile device location data on weekdays between 9 am and 5 pm. The example SPCI rules can be hierarchical such that a location of the mobile device is available on Tuesday at 11 am for a non-commercial purpose, which can prevent an advertiser from gaining access to the location of the mobile device but can allow the Department of Health to know the location of the mobile device, such as to track the spread of influenza during the flu season. As will be appreciated, an SPCI rule, or combination of a plurality of SPCI rules, especially in a hierarchical manner, can enable efficient and controlled permissive access to private data in a manner that preserves the security and privacy of the source of the volunteered data. This can allow data volunteers to maintain control over the volunteered data and can lead to an increased willingness to allow structured public consumption of otherwise private data.

Determination of an SPCI rule(s) can be based on input associated with the volunteered data or indicating the volunteered data. In an aspect, questions can be, for example, presented to an entity when setting up a source of volunteered data for storage on a protected portion of a public network. These questions, for example, can be in the form of a multiple choice question, via sliders inputs to indicate a level of comfort, via a white list or black list, based on inheriting constrains from the same, or another, hierarchical SPCI level, based on demographics, based on a type of data to be volunteered (e.g., financial data ca be more strictly constrained than car location data by default, etc.), or nearly any other technique for ascertaining a security or privacy constraint to be applied to the volunteered data, and all such technology is considered within the scope of the instant disclosure even where not recited for clarity and brevity. As an example, when a burglar alarm is set up, an SPCI rule(s) can be determined based on a series of multiple choice questions posed to the property owner, resident, manager, etc., such that access to alarm event information can be limited to the number of alarms triggered per year, only for non-commercial purposes, and permitted for access by an entity associated with a designated municipal government, e.g., a fire marshal, local police, or urban planning employee of the municipality. This can allow useful access to the burglar alarm data without exposing the data volunteer to collection of the volunteered data by competing commercial entities, such as another burglar alarm company that may want to gather the data in regards to marketing solicitations in the neighborhood.

In an aspect, access to volunteered data can be via versions of the volunteered data. The versioning can correspond to an SPCI related rule. As an example, a redacted version of volunteered data can be permitted at a first hierarchical SPCI level while an unaltered version of the same volunteered data can be permitted at a second hierarchical level. As such, under this example, traffic camera data for a gated community can be redacted for the consumption of the members of the gated community, but the unredacted traffic camera data can be accessed by law enforcement and court entities. Redaction can refer to altering content, e.g., text, image, video, audio, electronic representations thereof, etc., to obfuscate or destroy aspects of the content, for example fuzzing human faces, blacking out street signs, omitting names, clipping portions of an audio or video file, etc. All alterations to the volunteered data, even where not explicitly recited here, are to be considered within the scope of the presently disclosed subject matter, and can be referred to as 'redacted' or similar terms, even where the alteration may not strictly be a redaction, e.g., truncation of a video or audio file can be termed redaction, down sampling of a file to reduce fidelity can be termed redaction, etc.

In an embodiment, volunteered data can be of nearly any type and can be from nearly any source. As examples, volunteered data can be audio data, video data, meta-data, image data, location data, sensor data, social media data, temperature or other environmental data, speed data, alarm data, seismic data, medical data, health data, financial data, etc. Moreover, examples of data sources can be security/ATM cameras, burglar alarms, dash camera feeds, fitness trackers, connected thermostats, mobile phones, tablet computers, laptop computers, wearable computers, internet-of-thins (IoT) devices, etc. Furthermore, volunteered data from different sources can be stored in the same, different, or across a plurality of protected portions of a public network. As an example, user equipment (UE) location data and heartrate data can be volunteered into a protected cloud data store, e.g., a plurality of devices networked to provide flexible computing and data storage. Moreover, volunteered data from different data volunteers can be similarly stored. This can allow for efficient interrogation of the volunteered data subject to SPCI. As an example, the national institute of health (NIH) can request a specific range of location data for UEs that intersect a hospital location on a particular date. This request can be subject to SPCI related rules and volunteered data, selected in response to the corresponding SPCI rules being satisfied by the NIH request, can be aggregated and returned to the NIH, for example to track people potentially exposed to a disease identified at the hospital. This example can facilitate tracking a pandemic, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate, based on security and privacy rules, access to voluntarily provided data stored on a protected region of a data store, in accordance with aspects of the subject disclosure. System 100 can comprise data access controller component (DACC) 110. DACC 110 can receive security and privacy constraint information (SPCI) 130. SPCI can be correlated to volunteered data 140, and volunteered data 140 can be stored via data storage device 120, e.g., within protected portion 121. DACC 110 can then enable access to a portion of volunteered data 140 as accessible data 150.

In an embodiment, a request for access to the volunteered data can be received. The request can be associated with one or more attributes corresponding to the request. The attributes can be determined to satisfy one or more rules related to SPCI 130 prior to allowing access to a version of the volunteered data in response to the request for access, e.g., accessible data 150. As an example, an internet connected thermostat can be a source of volunteered data 140 that can be stored on protected area 121 of data storage device 120. In an aspect, data storage device 120 can be comprised in a public network. Volunteered data 140, e.g., the example thermostat data, can be correlated to SPCI 130, whereby SPCI 130 indicates that access is restricted to a local utility provider(s), e.g. gas company, electric company, etc., for example as part of a rebate incentive program, for participation in an energy consumption study, etc. Accordingly, accessible data 150 for the example volunteered thermostat data can be restricted to access by the example local utility provider(s).

In an aspect, other volunteered data can be correlated to other SPCI via DACC 110. Continuing the previous example, volunteered thermostat data from other internet connected thermostats can be stored and can associated with other SPCI(s). As such, where a request for thermostat data is received, DACC 110 can check attributes of the request against the other SPCI(s). Where the request attributes satisfy other rules related to the other SPCI(s), the other thermostat data can be accessible. In an embodiment, the group of accessible thermostat data can be aggregated and/or redacted by DACC 110 before being made accessible to the local utility provider(s) as accessible data 150. In another embodiment, the local utility provider(s) can be granted access to the group of accessible thermostat data without aggregation and/or without redaction, in accord with satisfaction of the corresponding SPCI rule(s), by DACC 110. Furthermore, other volunteered data, for example from smart appliances, smart lighting, etc., can be correlated with still other SPCI(s). These other example volunteered data can be accessible by the local utility provider(s) where the appropriate corresponding SPCI rule(s) are determined to be satisfied by DACC 110. In an aspect, volunteered data 140 stored at protected portion 121 can be organized, based on SPCI 130 corresponding to volunteered data 140, in an indexed manner that enables efficiently evaluating corresponding SPCI rule(s) in response to one or more attribute of a received request, e.g., indexing the protected portion 121 based on SPCI 130, etc.

Figure 2:
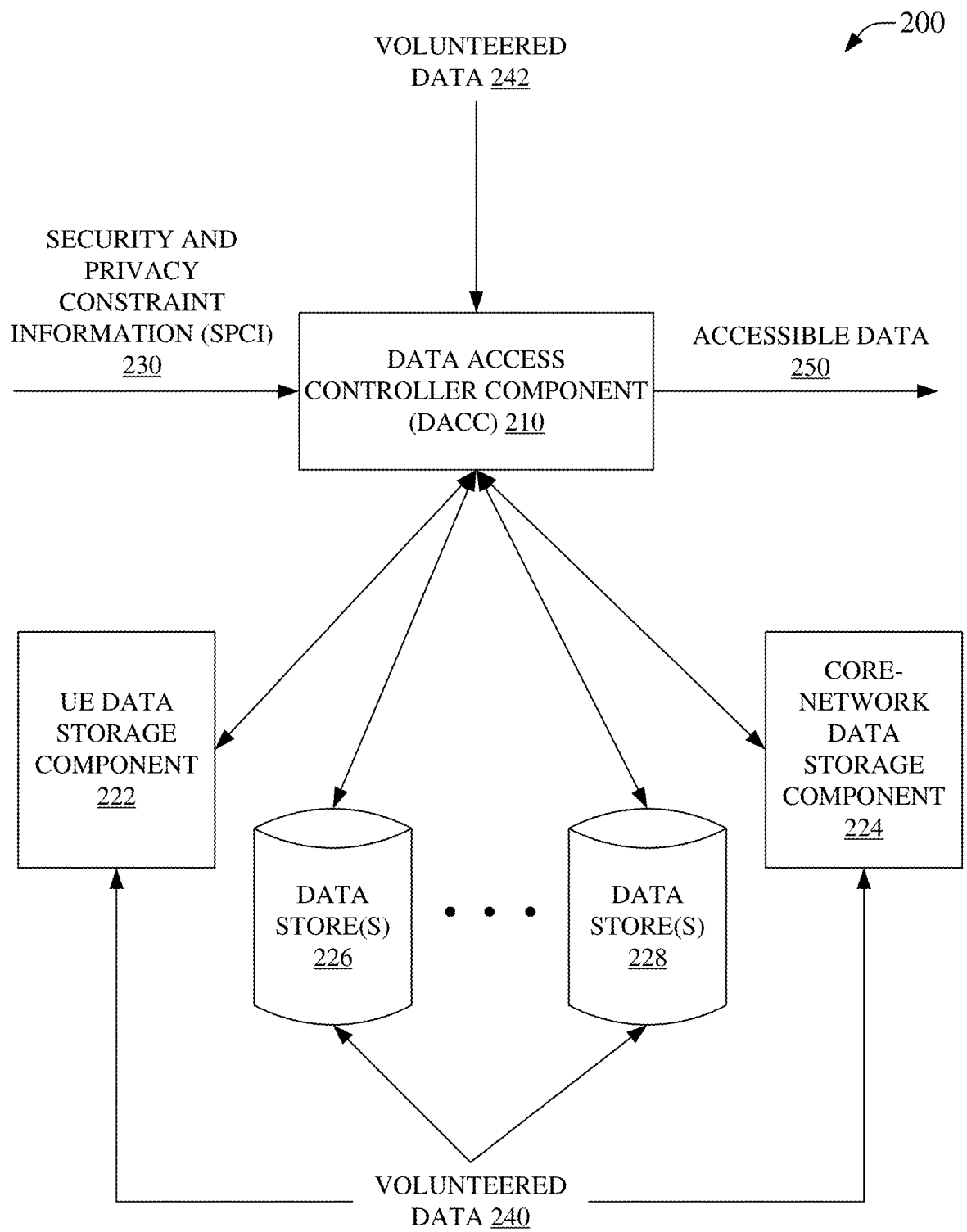
FIG. 2 is an illustration of an example system that can facilitate, based on security and privacy rules, access to voluntarily provided data stored on a protected region of a variety of data store(s), in accordance with aspects of the subject disclosure.

FIG. 2 is an illustration of a system 200, which can enable access to voluntarily provided data stored on a protected region of a variety of data store(s), wherein the access is constrained by based on security and privacy rules correlated to the stored voluntarily provided data, in accordance with aspects of the subject disclosure. System 200 can comprise DACC 210 that can receive SPCI 230. SPCI can be correlated to volunteered data 240. DACC 210 can then enable access to a portion of volunteered data 240 as accessible data 250.

Volunteered data 240 can be stored in protected portion(s), e.g., protected portion 121, etc., of a data storage device/component, e.g., UE data storage component 222, core-network data storage component 224, data store(s) 226-228, etc. In an aspect, a UE can have a portion of a local data store logically considered as part of a public network, e.g., extending 'the cloud' into the UE. This portion of the UE's local data store can be embodied as UE data storage component 222, which can itself comprise a protected portion, e.g., protected portion 121, etc. Additionally, a network provider can comprise a core-network component that can comprise one or more data stores that are part of a publicly accessible network, e.g., core-network data storage component 224. Core-network data storage component 224 can comprise a protected portion, e.g., protected portion 121, etc. Other embodiments of protected portion 121 can be comprised in one or more other data store(s), e.g., data store(s) 226-228. Volunteered data 240 can be stored on one or more of a protected portion of data store(s) 226-228. In an embodiment, this can provide for storage at a single protected portion of a data store selected from data store(s) 226-228. In another embodiment, this can provide for distributed storage across a plurality of protected portions of one or more of data store(s) 226-228. Moreover, distributed storage of volunteered data 240 can be at any level of granularity, for example contiguous files can be stored on one protected portion, can be stored across multiple protected portions of one data store, can be stored across multiple protected portions of multiple data stores, etc.

In an embodiment, a request for access to the volunteered data can be received. The request can be associated with one or more attributes corresponding to the request. The attributes can be determined to satisfy one or more rules related to SPCI 230 prior to allowing access to a version of the volunteered data in response to the request for access, e.g., accessible data 250. Volunteered data 240 can be correlated to SPCI 230, whereby SPCI 230 embodies a level of permitted access. DACC 210 can access volunteered data based on determining that a rule related to a corresponding SPCI 230 is satisfied, e.g., via one or more of UE data storage component 222, core-network data storage component 224, data store(s) 226-228, etc.

In an embodiment, DACC 210 can receive volunteered data 242 and receive correspondingly SPCI 230. DACC 210 can then cause volunteered data 242 to be stored in a protected portion of one or more of UE data storage component 222, core-network data storage component 224, data store(s) 226-228, etc. Volunteered data 242 can illustrate that DACC 210 can be associated volunteered data 242 received by DACC 210 with SPCI 230 and cause storage thereof. Volunteered data 240 can illustrate that DACC 210 can correlate SPCI 230 with volunteered data 240 that is not received by DACC 210 prior to storage in a protected portion of one or more of one or more of UE data storage component 222, core-network data storage component 224, data store(s) 226-228, etc. As such, DACC 210 can provide for correlation of volunteered data 240 as stored by other components, can provide for correlation and storage of volunteered data 242, can provide for accessing stored volunteered data 240, 242, etc., based on SPCI 230 one or more attribute(s) of a request, etc.

Figure 3:
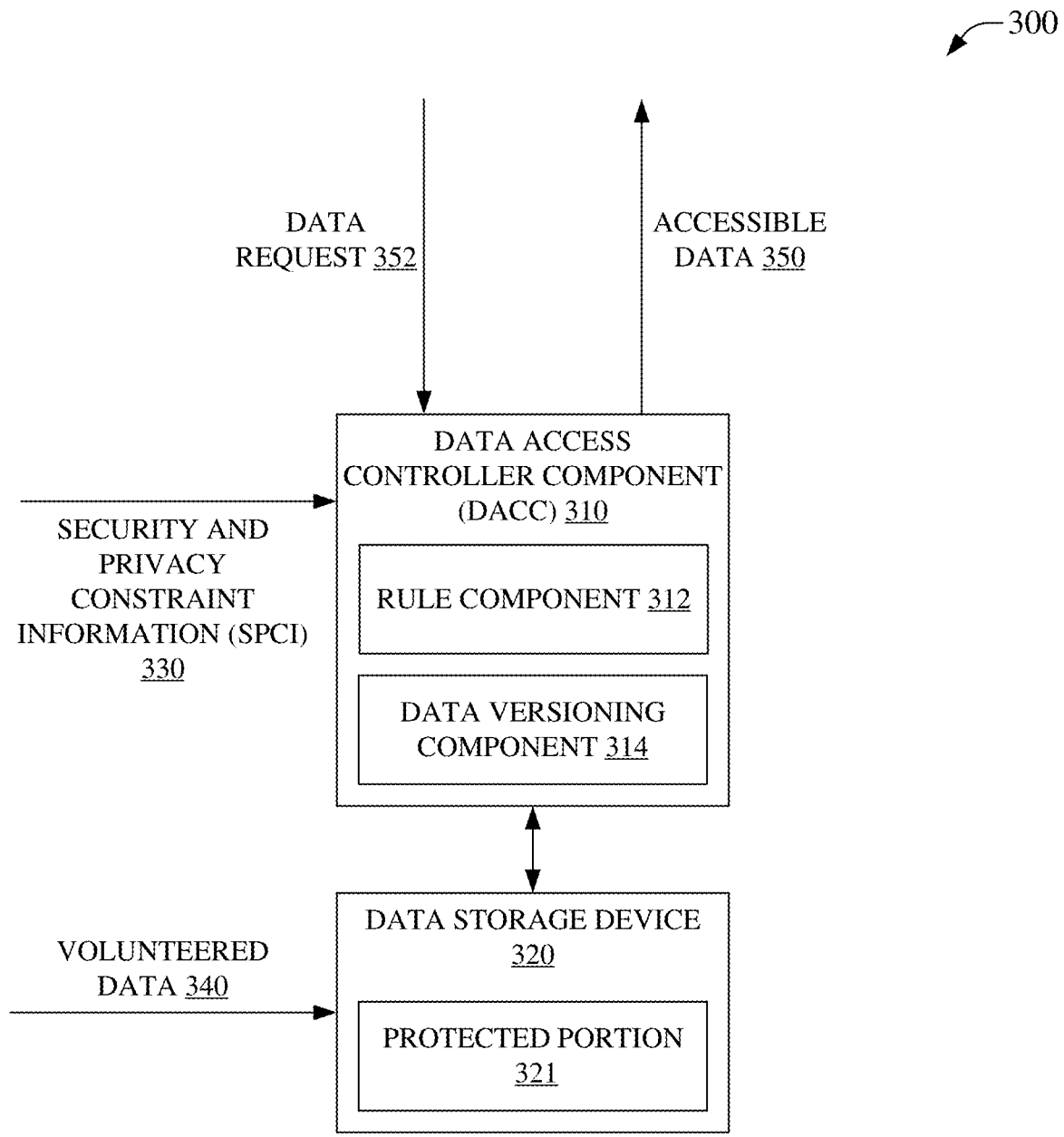
FIG. 3 is an illustration of an example system that can enable, based on security and privacy rules, access to a version of voluntarily provided data stored on a protected region of a data store, in accordance with aspects of the subject disclosure.

FIG. 3 is an illustration of a system 300, which can facilitate, based on security and privacy rules, access to a version of voluntarily provided data stored on a protected region of a data store, in accordance with aspects of the subject disclosure. System 300 can comprise DACC 310 that can receive SPCI 330. SPCI can be correlated to volunteered data 340. DACC 310 can then enable access to a portion of volunteered data 340 as accessible data 350 returned in response to data request 352. Volunteered data 340 can be stored in protected portion(s), e.g., protected portion 321, etc., of a data storage device/component, e.g., data storage component 320.

In an embodiment, a request for access to the volunteered data can be received as data request 352. Data request 352 can be associated with one or more attributes corresponding to the request. The attributes can be determined, via rule component 312, to satisfy one or more rules related to SPCI 330 prior to allowing access to a version of volunteered data 340 in response to data request 352, e.g., as accessible data 350. Volunteered data 340 can be correlated to SPCI 330 via DACC 310, wherein SPCI 330 can embody an indication of what volunteered data 340 is accessible in response to data request 352. DACC 310 can access volunteered data 340 based on determining, via rule component 312, that a rule related to a corresponding SPCI 330 is satisfied. In an aspect rule component 312 can determine one or more rules related to SPCI 330. Moreover, the one or more rules can be hierarchical, for example, such that a first rule related to SPCI 330 must be determined to be satisfied before proceeding to evaluating a second rule related to SPCI 330 in regards to accessing volunteered data 340. As such, for example, a global SPCI rule can be evaluated prior to evaluating a regional rule, prior to evaluating a local rule, prior to evaluating a highly granular rule, e.g., related to a specific volunteered file, etc. Further, where rule component 312 determines that one or more SPCI rule(s) have been satisfied, this information can be employed by data versioning component 314 to determine a version of volunteered data that can be returned as accessible data 350.

In an embodiment, DACC 310 can determine a version of volunteered data 340 to return as accessible data 350. Where all SPCI rules are determined to be satisfied with regard to data request 352 and SPCI 330, a corresponding portion of volunteered data 340 can be returned as accessible data 350. Additionally, for example where the SPCI rule(s) are hierarchical, satisfaction of a first level of SPCI rule(s) can result in returning a version of a portion of volunteered data 340. As an example, a first level of SPCI rule(s) can indicates that a highly redacted version of a portion of volunteered data 340 can be returned, a second level of SPCI rule(s) can indicates that a less redacted version of the portion of volunteered data 340 can be returned, and a third level of SPCI rule(s) can indicates that a full version of the portion of volunteered data 340 can be returned. Continuing the example, where the first level rule(s), but not the second level or third level rule(s), are determined to be satisfied via rule component 312, data versioning component 314 can return a highly redacted version of the requested portion of volunteered data 340, for example, truncating a file, fuzzing out human features or other identifying information, etc. Moreover, in this example, where the first level rule(s) and second level rule(s), but not the third level rule(s), are determined to be satisfied via rule component 312, data versioning component 314 can return a less redacted version of the requested portion of volunteered data 340, for example, truncating a file but not fuzzing out human features or other identifying information, etc. Further, in this example, where the first level rule(s), second level rule(s), and third level rule(s), are determined to be satisfied via rule component 312, data versioning component 314 can return a full version of the requested portion of volunteered data 340.

Data request 352 can be associated with one or more attributes corresponding to the request. An attribute of data request 352 can indicate what aspects of the volunteered data are of interest to the requestor, e.g., selection criteria, date/time ranges, etc., Moreover, the attribute can reflect how returned data is to be used, e.g., commercial, non-commercial, research, law enforcement, academic use, etc. An attribute can similarly indicate how returned data will be curated, e.g., destroyed after use, aggregated, published, anonymized, maintained for a time period, etc. In an aspect, the attribute can reflect who is requesting the data, e.g., a private company, a municipality, the federal government, law enforcement, etc. Generally speaking, the attribute(s) can reflect the 'who, what, when, where, why, and how' of the data. These attribute(s) can be determined to satisfy the SPCI rule(s) via rule component 312 and can serve to protect the security and privacy of the volunteered data, of volunteers of the volunteered data, etc. The volunteered data 340 remains controllable via SPCI 330 by applying SPCI related rules before allowing access to a portion of volunteered data 340 in a whole or redacted form.

Figure 4:
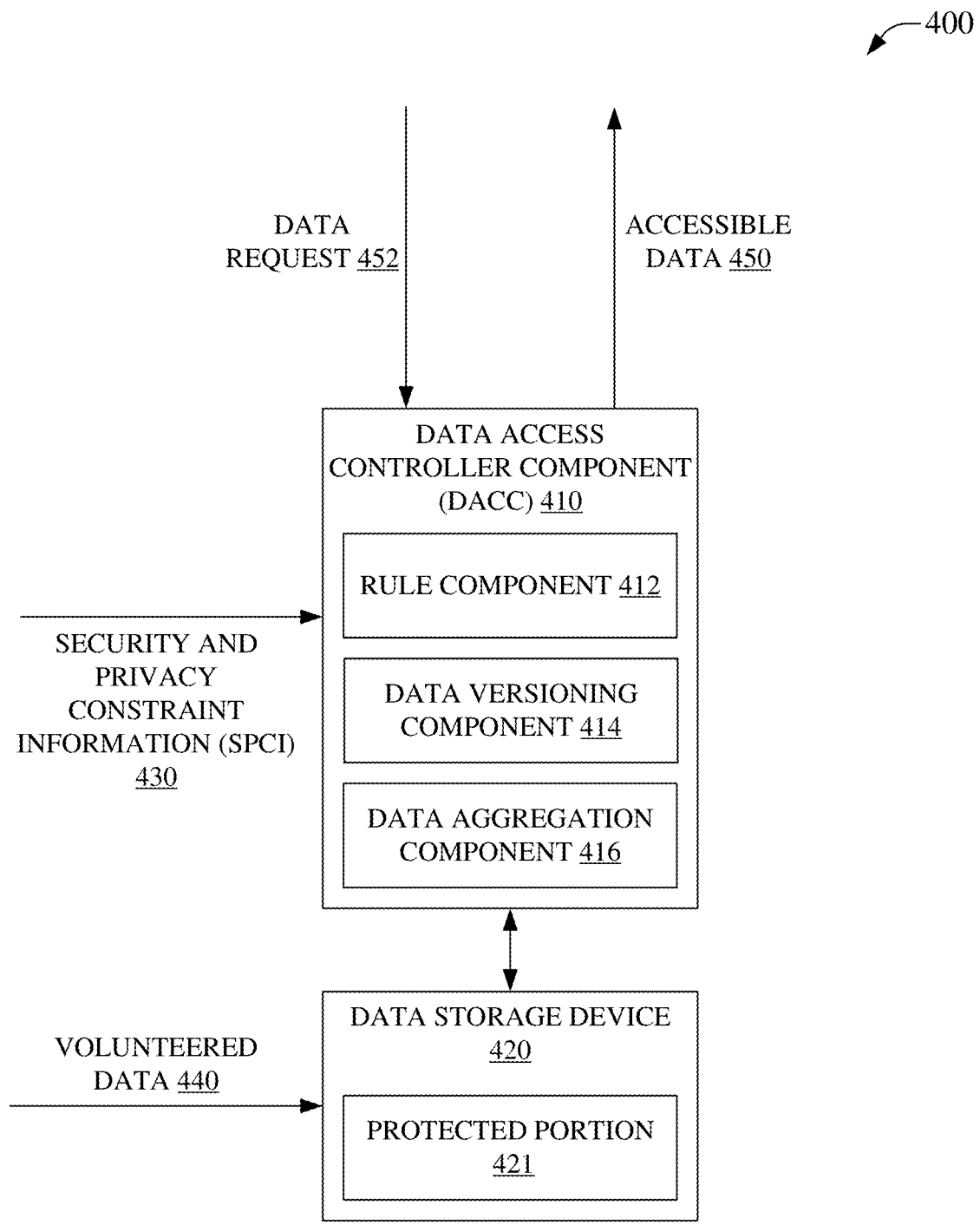
FIG. 4 illustrates an example system that can facilitate, based on security and privacy rules, access to aggregated versions of voluntarily provided data stored on a protected region of a data store, in accordance with aspects of the subject disclosure.

FIG. 4 is an illustration of a system 400, which can enable, based on security and privacy rules, access to aggregated versions of voluntarily provided data stored on a protected region of a data store, in accordance with aspects of the subject disclosure. System 400 can comprise DACC 410 that can receive SPCI 430. SPCI can be correlated to volunteered data 440. DACC 410 can then enable access to a portion of volunteered data 440 as accessible data 450 returned in response to data request 452. Volunteered data 440 can be stored in protected portion(s), e.g., protected portion 421, etc., of a data storage device/component, e.g., data storage component 420.

In an embodiment, a request for access to the volunteered data can be received as data request 452. Data request 452 can be associated with one or more attributes corresponding to the request. The attributes can be determined, via rule component 412, to satisfy one or more rules related to SPCI 430 prior to allowing access to a version of volunteered data 440 in response to data request 452, e.g., as accessible data 450. Volunteered data 440 can be correlated to SPCI 430 via DACC 410, wherein SPCI 430 can embody an indication of what volunteered data 440 is accessible in response to data request 452. DACC 410 can access volunteered data 440 based on determining, via rule component 412, that a rule related to a corresponding SPCI 430 is satisfied. In an aspect rule component 412 can receive or determine one or more rules related to SPCI 430. Moreover, the one or more rules can be hierarchical.

In an embodiment, DACC 410 can determine a version of volunteered data 440 to return in accessible data 450. Where all SPCI rules are determined to be satisfied with regard to data request 452 and SPCI 430, a corresponding portion of volunteered data 440 can be returned as accessible data 450. Additionally, for example where the SPCI rule(s) are hierarchical, satisfaction of a first level of SPCI rule(s) can result in returning a version of a portion of volunteered data 440.

Data request 452 can be associated with one or more attributes corresponding to the request. An attribute of data request 452 can indicate what aspect(s) of the volunteered data are of interest to the requestor. Moreover, the attribute can reflect how returned data is to be used. An attribute can similarly indicate how returned data will be held. In an aspect, the attribute can reflect who is requesting the data. Generally speaking, the attribute(s) can reflect the 'who, what, when, where, why, and how' of the data. These attribute(s) can be determined to satisfy the SPCI rule(s) via rule component 412 and can serve to protect the security and privacy of the volunteered data, of volunteers of the volunteered data, etc. The volunteered data 440 remains controllable via SPCI 430 by applying SPCI related rules before allowing access to a portion of volunteered data 440 in a whole or redacted form.

DACC 410 can comprise data aggregation component 416. Data aggregation component 416 can aggregate one or more portions of volunteered data 440 where the one or more portions are accessible in response to applying the SPCI related rule(s). Moreover, the aggregation of data can comprise versioned volunteered data, e.g., combining redacted and unredacted portions of volunteered data 440, where a corresponding SPCI rule or level of SPCI rule(s) are satisfied and meet data request 452 criteria. Further, data aggregation can aggregate volunteered data 440 from one or more volunteering sources, for example volunteered data from smart homes on a particular street or neighborhood can be aggregated and returned to a utility provider, etc., where the individual house SPCI rule(s) are satisfied. In an aspect, this can be an alternative to returning the individual portions of volunteered data 340 to the utility, as can be performed in another embodiment.

Figure 5:
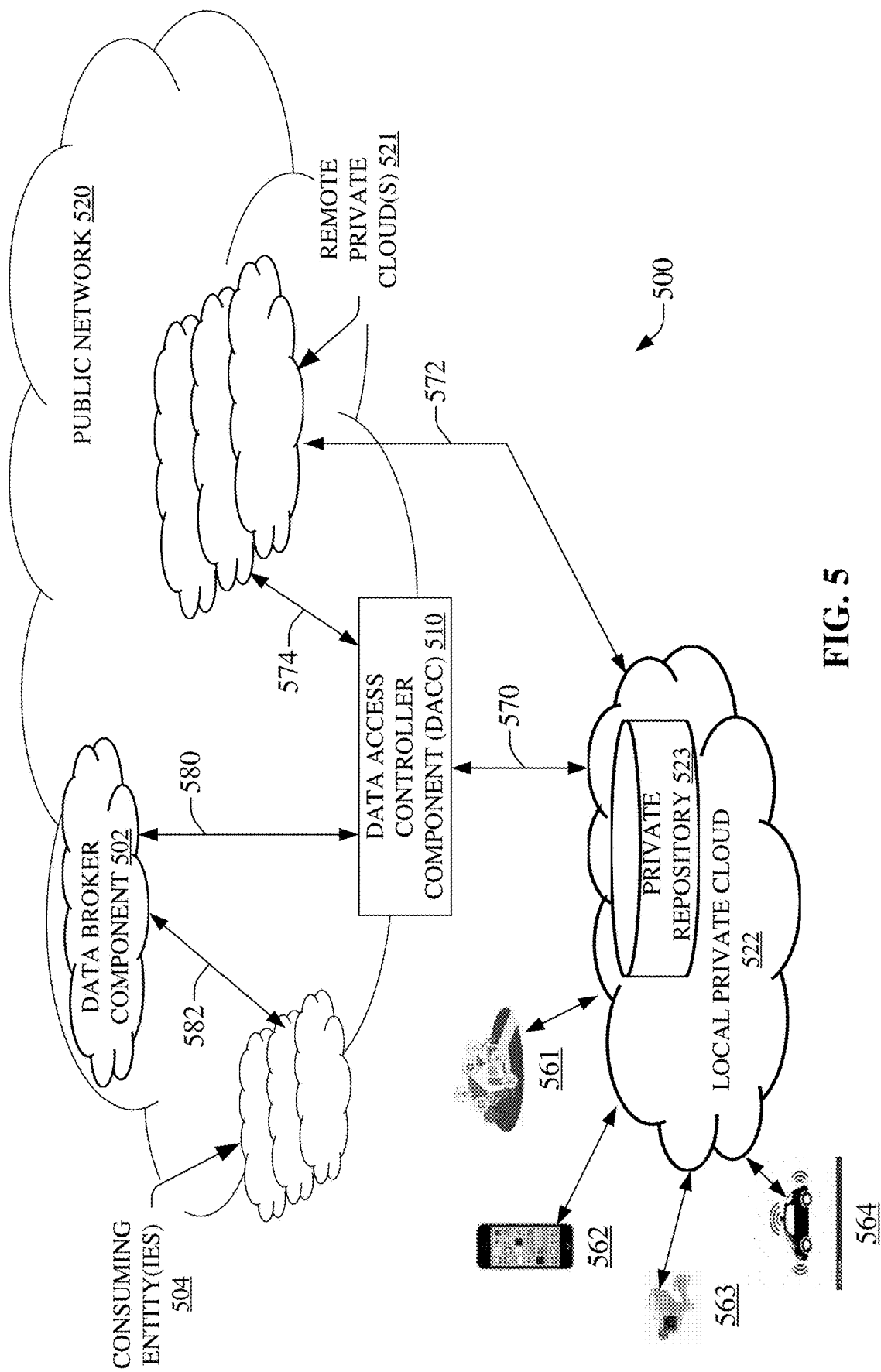
FIG. 5 is an illustration of an example system, facilitating, based on security and privacy rules, access to voluntarily provided data stored on a remote private cloud of a public network, in accordance with aspects of the subject disclosure.

FIG. 5 is an illustration of an example system 500, facilitating, based on security and privacy rules, access to voluntarily provided data stored on a remote private cloud of a public network, in accordance with aspects of the subject disclosure. System 500 can comprise data access controller component (DACC) 510. DACC 510 can receive security and privacy constraint information (SPCI). SPCI can be correlated to volunteered data, e.g., from private devices 561-564 as can be stored on a local private cloud 522, e.g., via private repository 523. Volunteered data can be stored on public network 520, e.g., within protected portion(s) of data storage device(s) of remote private cloud 521. Volunteered data can be places on remote private cloud(s) 521 from local private cloud 522 via communications pathway 572 or via DACC 510 and communications pathways 570 and 574. System 500 then enable access to a portion of volunteered data stored on remote private cloud(s) 521 via communication pathway 580 to data broker component 502.

In an embodiment, a request for access to the volunteered data can be received from data broker component 502 by DACC 510 via communication pathway 580. The request can be associated with one or more attributes corresponding to the request. The attributes can be determined to satisfy one or more rules related to SPCI prior to allowing access to a version of the volunteered data in response to the request for access. As an example, an internet connected thermostat, e.g., in house 561, etc., can be a source of volunteered data that can be stored on a protected area of remote private cloud 521 of public network 520 via the illustrated communication pathways, e.g., 570/DACC 510/574, 572, etc. Volunteered data, e.g., the example thermostat data, can be correlated to SPCI, which can be received by DACC 510 via communications path 570, whereby SPCI indicates security and privacy characteristics related to access to the volunteered data. Accordingly, accessible data, such as accessible data 150-450, for example the volunteered thermostat data that comports with SPCI, can be communicated to data broker component 502 via communication pathway 580 for dissemination to consuming entity(ies) 504 via communication path 582 by DACC 510.

In an aspect, other volunteered data can be correlated to other SPCI via DACC 510. Continuing the previous example, volunteered thermostat data from other internet connected thermostats can be stored and can associated with other SPCI(s). As such, where a request for thermostat data is received, DACC 510 can check attributes of the request against the other SPCI(s). Where the request attributes satisfy other rules related to the other SPCI(s), the other thermostat data can be accessible. In an embodiment, the group of accessible thermostat data can be aggregated and/or redacted by DACC 510 before being made accessible to the local utility provider(s) as accessible data 550. In another embodiment, access to the group of accessible thermostat data can be without aggregation and/or without redaction, in accord with satisfaction of the corresponding SPCI rule(s) by DACC 510. Furthermore, other volunteered data, for example from private devices 561-564, etc., can be correlated with still other SPCI(s) for storage and controlled access via remote private cloud(s) 521. These other example volunteered data can be accessible where the appropriate corresponding SPCI rule(s) are determined to be satisfied by DACC 510.

Figure 6:
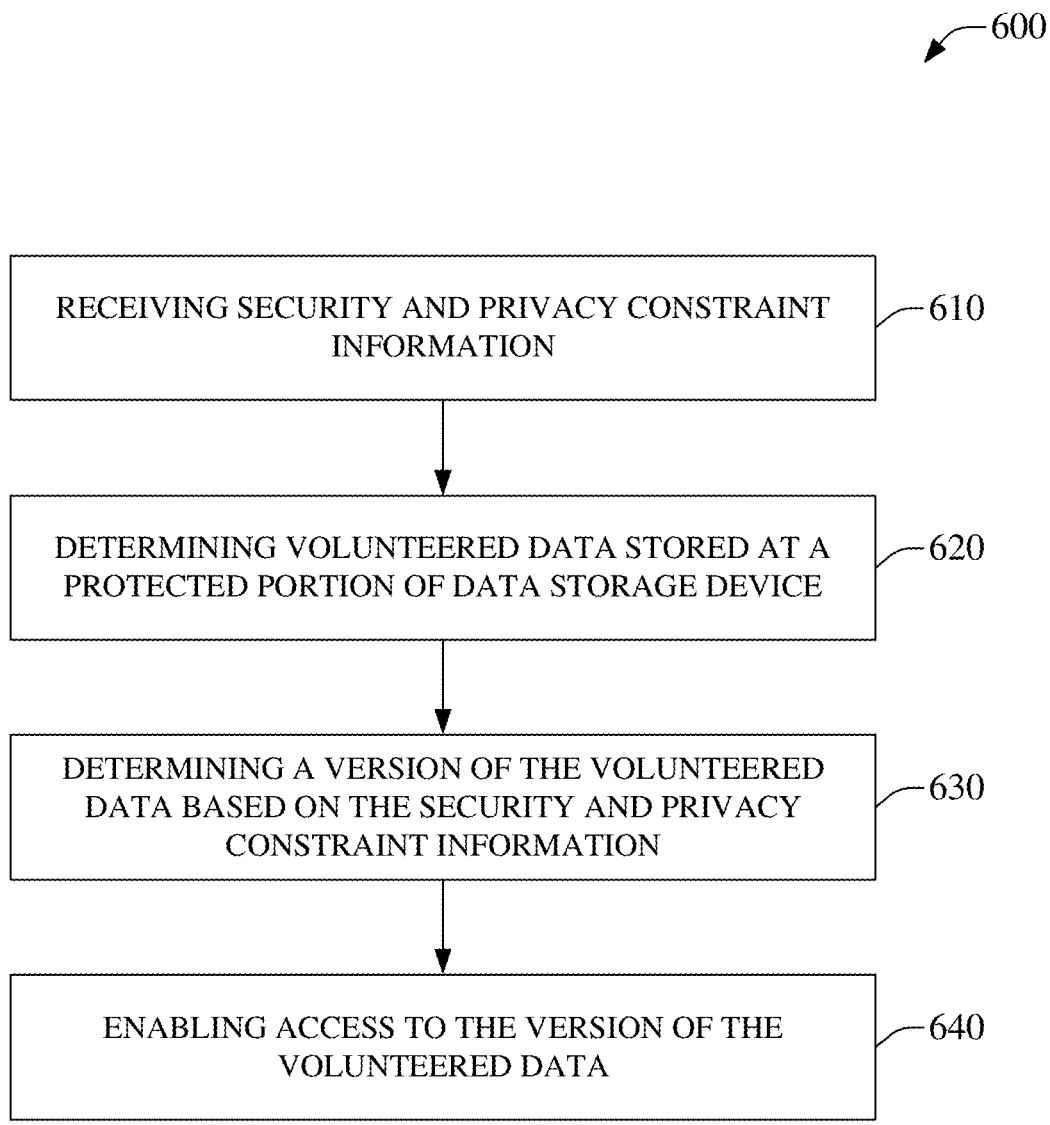
FIG. 6 is an illustration of an example method, enabling, based on security and privacy rules, access to voluntarily provided data stored on a protected region of a data store, in accordance with aspects of the subject disclosure.
Figure 7:
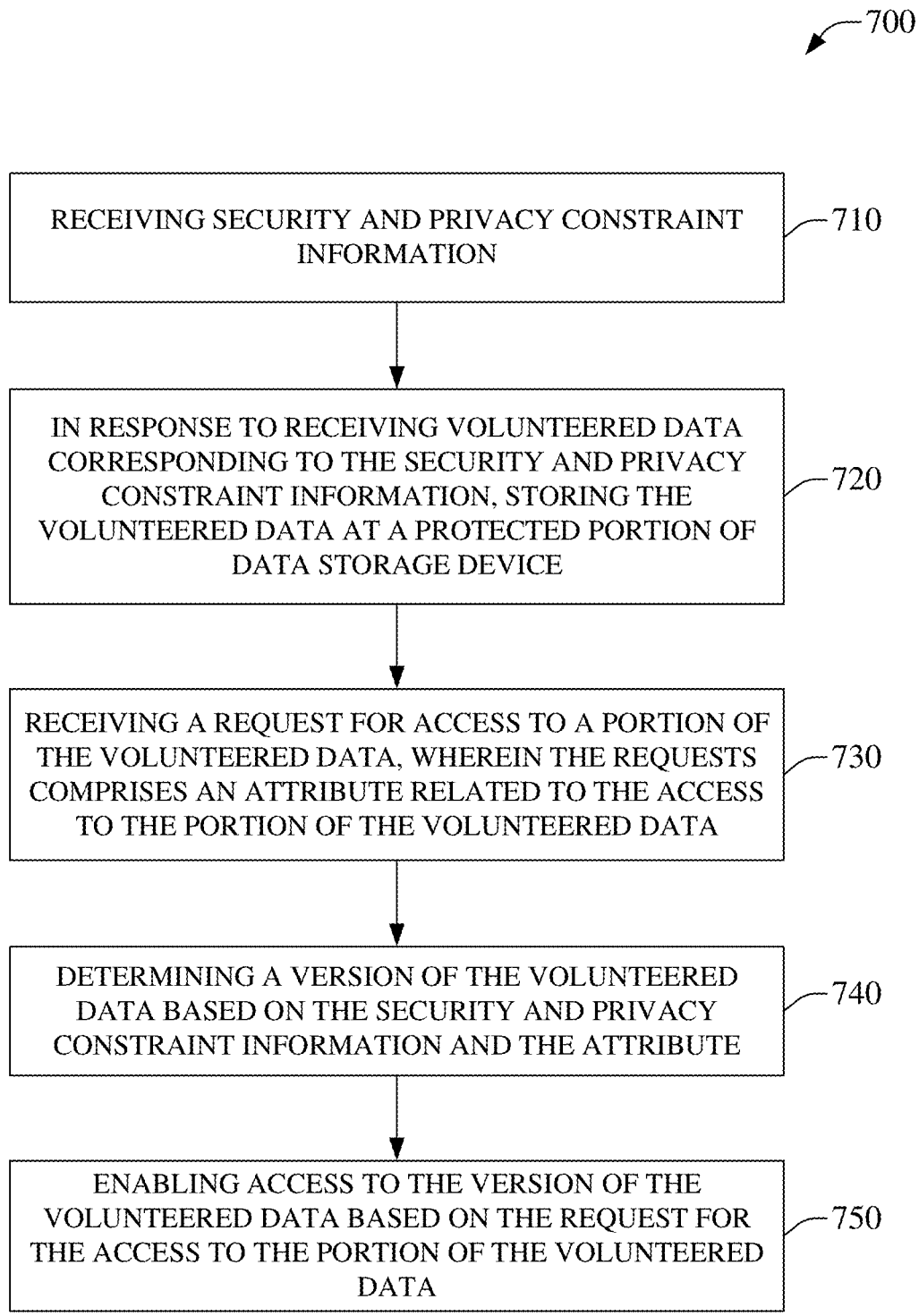
FIG. 7 illustrates an example method, facilitating storage of voluntarily provided data correlated to security and privacy constraints, and enabling access to a version of the stored data based on a request attribute and the security and privacy constraints, in accordance with aspects of the subject disclosure.
Figure 8:
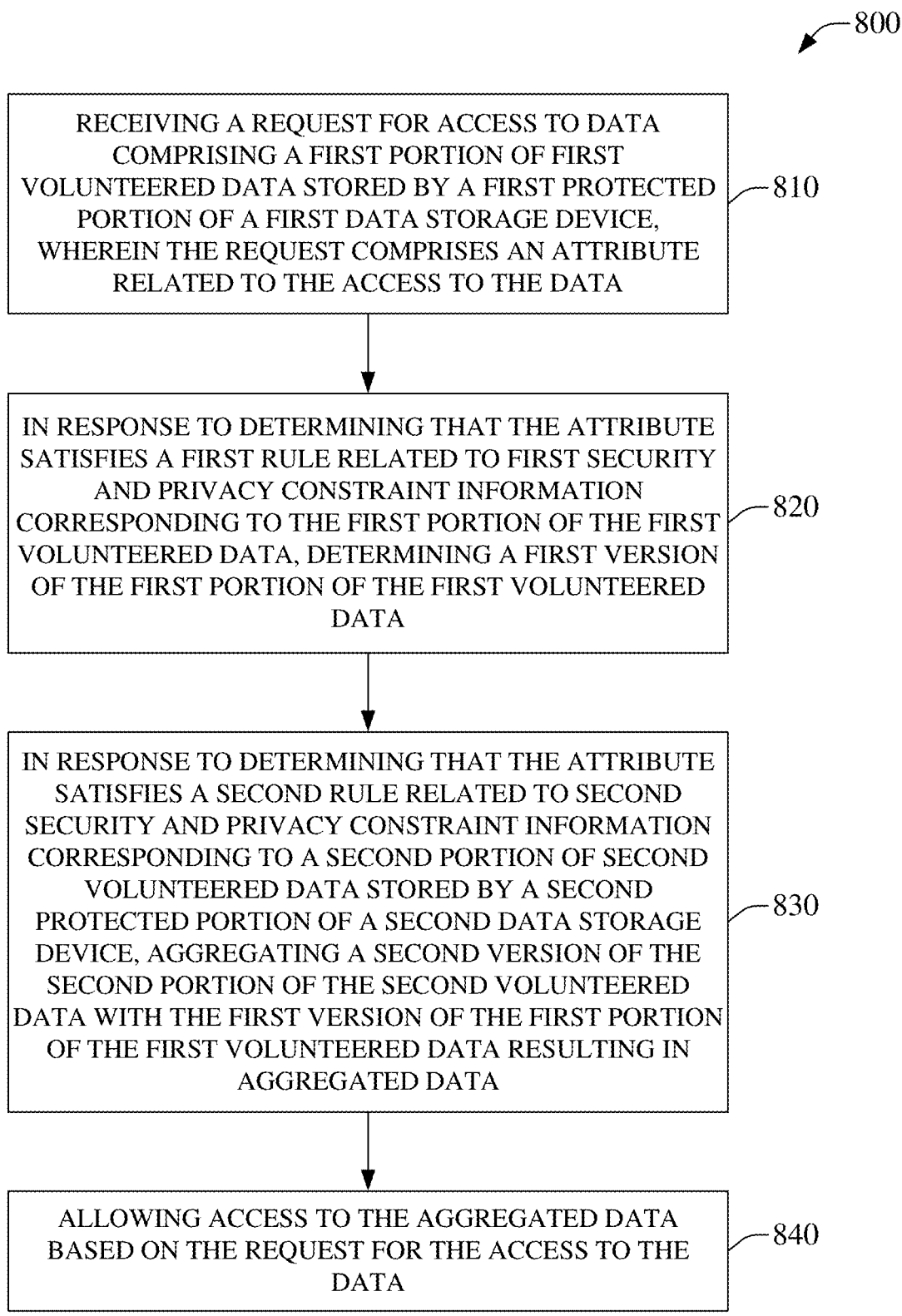
FIG. 8 illustrates an example method, enabling, based on security and privacy rules, access to aggregated voluntarily provided data from on a protected region of a data store, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate, based on security and privacy rules, access to voluntarily provided data stored on a protected region of a data store, in accordance with aspects of the subject disclosure. At 610, method 600 can comprise receiving security and privacy constraint information (SPCI). SPCI can reflect constraints selected by, or determined for, a party volunteering the private data. The SPCI can be correlated to volunteered data and the volunteered data can be stored in a protected portion of a public network.

At 620, method 600 can comprise determining volunteered data stored at a protected portion of a data storage device, e.g., comprised in a public network, UE, core-network, etc. Volunteered data can be of nearly any type and can be from nearly any source. As examples, volunteered data can be audio data, video data, meta-data, image data, location data, sensor data, social media data, temperature or other environmental data, speed data, alarm data, seismic data, medical data, health data, financial data, etc. Moreover, examples of data sources can be security/ATM cameras, burglar alarms, dash camera feeds, fitness trackers, connected thermostats, mobile phones, tablet computers, laptop computers, wearable computers, internet-of-thins (IOT) devices, etc. Furthermore, volunteered data from different sources can be stored in the same, different, or across a plurality of protected portions of a public network. As an example, UE location data and heartrate data can be volunteered into a protected cloud data store, e.g., a plurality of devices networked to provide flexible computing and data storage. Moreover, volunteered data from different data volunteers can be similarly stored. This can allow for efficient interrogation of the volunteered data subject to SPCI.

At 630, method 600 can comprise determining a version of the volunteered data based on the SPCI. Access to volunteered data can be via versions of the volunteered data. The versioning can correspond to an SPCI related rule. As an example, a redacted version of volunteered data can be permitted at a first hierarchical SPCI level while an unaltered version of the same volunteered data can be permitted at a second hierarchical level. As such, under this example, electric bill data for homes of a community can be redacted, e.g., removing names, addresses, etc., for the consumption of the members of the community, but a less redacted electric bill data can be accessed by an academic research entity. Redaction can refer to altering content, e.g., text, image, video, audio, electronic representations thereof, etc., to obfuscate or destroy aspects of the content, for example fuzzing human faces, blacking out street signs, omitting names, clipping portions of an audio or video file, etc. All alterations to the volunteered data, even where not explicitly recited here, are to be considered within the scope of the presently disclosed subject matter, and can be referred to as 'redacted' or similar terms, even where the alteration may not strictly be a redaction, e.g., truncation of a video or audio file can be termed redaction, down sampling of a file to reduce fidelity can be termed redaction, etc.

In an embodiment, a request for access to the volunteered data can be received. The request can be associated with one or more attributes corresponding to the request. The attributes can be determined to satisfy one or more rules related to the SPCI prior to allowing access to a version of the volunteered data in response to the request for access. As an example, security camera content can be voluntarily stored on a protected area of a public network and correlated to SPCI indicating it is accessible only for law enforcement. Accordingly, a request for access to the security camera content from the local police can be granted, e.g., based on the request having an attribute indicating that the requestor is the local police department, which can satisfy the example SPCI rule. Similarly, a request for access by a television broadcast entity can be denied where they are not a law enforcement agency.

At 640, method 600 can comprise enabling access to the version of the volunteered data. At this point method 600 can end. In an embodiment, access can be enabled by providing the portion of the volunteered data to the requestor, e.g., directly, via a data broker component 502, etc., by providing a secure link to the data, etc. Access to the version of the volunteered data can be constrained to the SPCI. This can allow entities volunteering data to maintain an element of control over the volunteered data. This control can include limiting access to the volunteered data via versioning/redacting, aggregation, anonymization, etc., and via one or more tiers of hierarchical SPCI related rules that can be based on who, what, when, where, how, and why access to volunteered data is requested.

FIG. 7 illustrates example method 700 that facilitates storage of voluntarily provided data correlated to security and privacy constraints, and enabling access to a version of the stored data based on a request attribute and the security and privacy constraints, in accordance with aspects of the subject disclosure. Method 700, at 710, can comprise receiving security and SPCI that can reflect constraints selected by, or determined on behalf of, an entity volunteering otherwise private data. The SPCI can be correlated to volunteered data and the volunteered data can be stored in a protected portion of a public network.

At 720, method 700 can comprise storing volunteered data. The storing of the volunteered data can be in response to receiving volunteered data that corresponds to the SPCI received at 710. The volunteered data can be stored at a protected portion of a data storage device(s). Volunteered data can be of nearly any type and can be from nearly any source. Furthermore, volunteered data from different sources can be stored in the same, different, or across a plurality of protected portions of the storage device(s). Moreover, volunteered data from different data volunteers can be similarly stored. This can allow for efficient interrogation of the volunteered data correlated to SPCI.

At 730, method 700 can comprise receiving a request for access to the volunteered data. The request can be associated with one or more attributes corresponding to the request. The attributes can be determined to satisfy one or more rules related to the SPCI prior to allowing access to a version of the volunteered data in response to the request for access. As an example, UE location information content can be voluntarily stored on a protected area of a storage device and be correlated to SPCI indicating it is accessible only when aggregated with a selectable count of other location data from other volunteers. Accordingly, a request for access to the location data, where it can be aggregated with at least the threshold count of other location data from other volunteers, can be granted.

At 740, method 700 can comprise determining a version of the volunteered data based on the SPCI. Access to volunteered data can be via versions of the volunteered data. The versioning can correspond to an SPCI related rule, e.g., continuing the previous example, a version of the example location data can be a version comprising the location data when aggregated with at least the threshold count of other location data from other volunteers. In an aspect, a redacted version of volunteered data can be permitted at a first hierarchical SPCI level while a differently redacted, or unaltered, version of the same volunteered data can be permitted at a second hierarchical level. As such, under the previous example, a first threshold level of other location data from other volunteers can result in an aggregation that is redacted to present location data at a first granularity, such as +/−1000 meters, which a second threshold level of other location data from other volunteers can result in an aggregation that is differently redacted to present location data at a second granularity, such as +/−250 meters. Redaction can refer to altering content, e.g., text, image, video, audio, electronic representations thereof, etc., to obfuscate or destroy aspects of the content, for example fuzzing human faces, blacking out street signs, omitting names, clipping portions of an audio or video file, etc. All alterations to the volunteered data, even where not explicitly recited here, are to be considered within the scope of the presently disclosed subject matter, and can be referred to as 'redacted' or similar terms, even where the alteration may not strictly be a redaction, e.g., truncation of a video or audio file can be termed redaction, down sampling of a file to reduce fidelity can be termed redaction, etc.

At 750, method 700 can comprise enabling access to the version of the volunteered data. At this point method 700 can end. In an embodiment, access can be enabled by providing the portion of the volunteered data to the requestor, e.g., directly, via a data broker component 502, etc., by providing a secure link to the data, etc. Access to the version of the volunteered data can be constrained to the SPCI. This can allow entities volunteering data to maintain an element of control over the volunteered data. This control can include limiting access to the volunteered data via versioning/redacting, aggregation, anonymization, etc., and via one or more tiers of hierarchical SPCI related rules that can be based on who, what, when, where, how, and why access to volunteered data is requested.

FIG. 8 illustrates example method 800 enabling, based on security and privacy rules, access to aggregated voluntarily provided data from on a protected region of a data store, in accordance with aspects of the subject disclosure. Method 800, at 810, can comprise receiving a request for access to data comprising a first portion of first volunteered data. The first portion of the first volunteered data can be stored in a first protected portion of a first data storage device. The request can comprise one or more attributes corresponding to the request. The attributes can be determined to satisfy one or more rules related to SPCI prior to allowing access to a version of the first portion of the first volunteered data in response to the request for access.

At 820, method 800 can comprise determining a first version of the first portion of the first volunteered data. Determining the first version of the volunteered data can be based on the SPCI. Moreover, the determining the first version of the first portion of the first volunteered data can be in response to determining that the one or more attribute(s) satisfy a first rule related to first SPCI corresponding to the first portion of the first volunteered data. More generally, access to volunteered data can be via versions of the volunteered data. The versioning can correspond to an SPCI related rule. In an aspect, versioning can comprise generating a redacted version(s) of volunteered data at hierarchical SPCI level(s). Redaction can refer to nearly any altering of volunteered data/content, even where not explicitly recited herein, all of which are to be considered within the scope of the presently disclosed subject matter.

At 830, method 800 can comprise aggregating a second version of a second portion of second volunteered data with the first version of the first portion of the first volunteered data, resulting in aggregated data. Generating the aggregated data can be in response to determining that the attribute of a request, e.g., the request received at 810, etc., satisfies a second rule related to second SPCI corresponding to the second portion of the second volunteered data. In an aspect, the second portion of the second volunteered data can be stored at a second protected portion of a second data storage device.

At 840, method 800 can comprise allowing access to the aggregated data based on the request for the access to the data from 810. At this point method 800 can end. In an embodiment, access can be enabled by providing the aggregated data to the requestor, e.g., directly, via a data broker component 502, etc., by providing a secure link to the aggregated data, etc. Access to the aggregated data can be constrained to and be informed by the SPCI. This can allow entities volunteering data to maintain an element of control over the volunteered data. This control can include limiting access to the volunteered data via versioning/redacting, aggregation, anonymization, etc., and via one or more tiers of hierarchical SPCI related rules that can be based on who, what, when, where, how, and why access to volunteered data is requested.

In an embodiment, the storing of the volunteered data can be in response to receiving volunteered data that corresponds to SPCI. The volunteered data can be stored at one or more protected portion(s) of one or more data storage device(s). Volunteered data can be of nearly any type and can be from nearly any source. Furthermore, volunteered data from different sources can be stored in the same, different, or across a plurality of protected portions of the storage device(s). Moreover, volunteered data from different data volunteers can be similarly stored. This can allow for efficient interrogation of the volunteered data correlated to SPCI.

Figure 9:
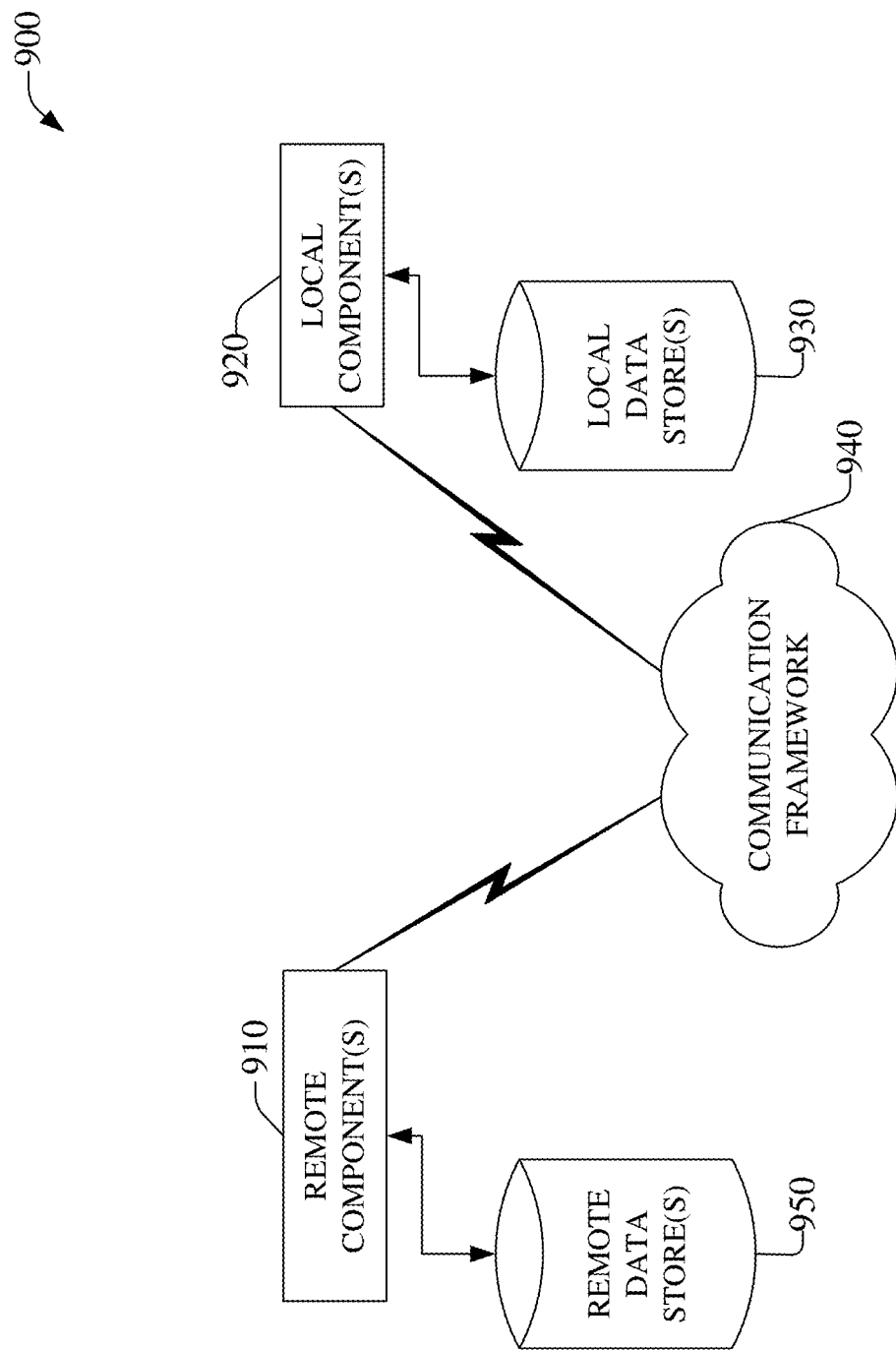
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise data storage device 120, 320, 420, etc., UE data storage component 222, etc., core-network data storage component 224, etc., data store(s) 226-228, etc., data broker component 502, etc., private devices 561-564, etc., consuming entities 504, etc.

The system 900 also comprises one or more local component(s) 920. The local component(s) 920 can be hardware and/or software (e.g., threads, processes, computing devices). In some embodiments, local component(s) 920 can comprise DACC 110-510, etc., data storage device 120, 320, 420, etc., UE data storage component 222, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, volunteered data 140-440, 242, 561-564, etc., can be received from corresponding remoted components by DACC 110-510, etc.; DACC 110-510, etc., can enable access to a version of a portion of volunteered data stored on a protected portion of remotely located storage device; etc., In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
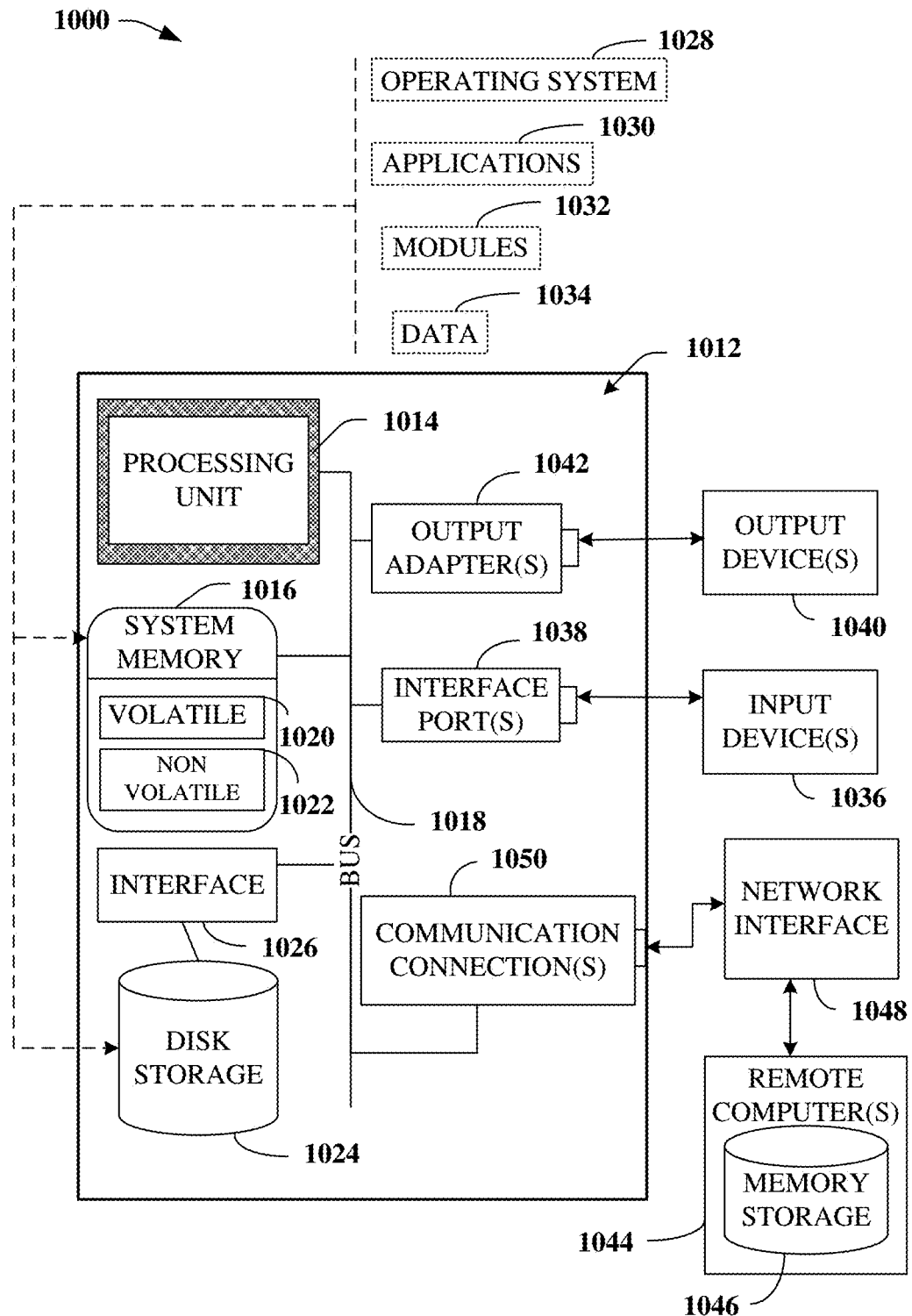
FIG. 10 illustrates an example block diagram of a computing system operable to execute the disclosed systems and methods in accordance with an embodiment.

FIG. 10 illustrates a block diagram of a computing system 1000 operable to execute the disclosed systems and methods in accordance with an embodiment. Computer 1012, which can be, for example, comprised in DACC 110-510, etc., data broker component 502, etc., private devices 561-564, etc., consuming entities 504, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising receiving, by DACC 110-510, etc., SPCI corresponding to volunteered data stored on a protected portion of a storage device, determining a version of a portion of the volunteered data based on the SPCI, and enabling access to a version of a portion of the volunteered data based on the SPCI and an attribute of a request for data access.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   in response to receiving requests for respective accesses of relevant data of data that has been stored in a network storage device,
   adapting, based on a first hierarchical privacy rule for facilitation of a first access of the respective accesses of the relevant data, a copy of the data to obtain first level data, and
   further adapting, based on a second hierarchical privacy rule that is different from the first hierarchical privacy rule and that facilitates a second access of the respective accesses, the copy to obtain second level data that is different from the first level data, wherein the second level data is different from the first level data based on a difference between a first alteration of the data represented in the first level data and a second alteration of the data represented in the second level data; and
   in response to determining that a request of the requests satisfies the second hierarchical privacy rule, enabling the second access of the relevant data.

2. The device of claim 1, wherein the request is received from a device that is associated with a subscribing entity.

3. The device of claim 2, wherein the operations further comprise:
   receiving privacy settings comprising the first hierarchical privacy rule and the second hierarchical privacy rule for facilitation of the respective accesses.

4. The device of claim 1, wherein the first level data is an altered version of the data.

5. The device of claim 4, wherein the first level data is less than all of the data.

6. The device of claim 4, wherein the altered version is a redaction of the data.

7. The device of claim 6, wherein the redaction comprises the redaction of an identifying feature of the data, and wherein the identifying feature is selected from a group comprising a human body, a street sign, a landmark structure, a license plate, and portions of the human body, the street sign, the landmark structure, and the license plate.

8. The device of claim 1, wherein the first alteration results in a first amount of the data comprised in the first level data and the second alteration results in a second amount of the data comprised in the second level data, and wherein the first amount is a different amount than the second amount.

9. The device of claim 1, wherein the first alteration results in a first redaction of the data comprised in the first level data and the second alteration results in a second redaction of the data comprised in the second level data, and wherein the first redaction is a different redaction than the second redaction.

10. The device of claim 1, wherein the data is first data different from second data, wherein the request is a first request, wherein the relevant data is first relevant data, wherein the copy is a first copy, wherein the first level data is first level first data, and wherein the operations further comprise:
in response to receiving the second data for storage in the network storage device, determining that the second data is accessible from the network storage device based on the first hierarchical privacy rule; and
in response to receiving a second request for second relevant data,
determining that the second data comprises the second relevant data,
determining that the second request satisfies the first hierarchical privacy rule, and
based on the first hierarchical privacy rule, adapting a second copy of the second data to obtain first level second data, and
enabling access to the second relevant data, wherein the second relevant data comprises the first level first data and the first level second data.

11. A method, comprising:
receiving, by a system comprising a processor, a request for an access of respective accesses of data that has been stored in a data storage device of the system;
adapting, by the system based on a first privacy rule that facilitates a first access of the respective accesses of a first version of the data, a copy of the data to obtain the first version;
further adapting, by the system based on a second privacy rule that facilitates a second access of the respective accesses of a second version of the data that is different from the first version, the copy to obtain the second version, wherein the second level data is different from the first level data based on a difference between a first alteration of the data represented in the first level data and a second alteration of the data represented in the second level data; and
in response to determining that the request satisfies the second privacy rule and that the data comprises the second version, facilitating, by the system, the second access of the second version.

12. The method of claim 11, wherein the second version comprises a redaction of the data.

13. The method of claim 12, wherein the redaction comprises the redaction of an identifying feature of the data, and wherein the identifying feature is selected from a group comprising at least part of a human body, at least part of a street sign, at least part of a landmark structure, and at least part of a license plate.

14. The method of claim 11, wherein receiving the request comprises:
receiving the request from a requesting device that is affiliated with a data access subscription related to recurring access to respective versions of the data comprising the first version and the second version.

15. A non-transitory machine-readable medium, comprising executable instructions that, when executed by a processor, facilitate performance of operations, comprising:
receiving a request to access data that has been stored in a data storage device, wherein the request comprises an attribute corresponding to the data;
in response to the request being determined to satisfy first privacy information, adapting, based on the attribute, a copy of the data to obtain first level data; and
in response to the request being further determined to satisfy second privacy information, further adapting the copy of the data to obtain second level data, wherein the second level data is different from the first level data based on a difference between a first alteration of the data represented in the first level data and a second alteration of the data represented in the second level data; and
facilitating a privacy based access of the second level data.

16. The non-transitory machine-readable medium of claim 15, wherein the first level data is a redacted version of the data, and wherein a level of the redaction is selected based on the first privacy information and the attribute.

17. The non-transitory machine-readable medium of claim 15, wherein the second level data has been aggregated with the first level data.

18. The non-transitory machine-readable medium of claim 15, wherein the operations further comprise:
determining that the first privacy information has been satisfied based on the attribute.

19. The non-transitory machine-readable medium of claim 15, wherein the requesting device comprises a subscribing entity device.

\* \* \* \* \*

UNITED STATES PATENT AND TRADEMARK OFFICE
CERTIFICATE OF CORRECTION

| | |
|---|---|
| PATENT NO. | : 11,436,355 B2 |
| APPLICATION NO. | : 17/033492 |
| DATED | : September 6, 2022 |
| INVENTOR(S) | : Sangar Dowlatkhah and Erie Lai Har Lau |

It is certified that error appears in the above-identified patent and that said Letters Patent is hereby corrected as shown below:

On the Title Page

In page 2, Column 2, item (56), other publications, cite no. 6, delete "us-en/acnmedia", and insert --us-en/_acnmedia--, therefor.

In the Specification

In Column 3, Line(s) 15, after "access to", delete "the a", and insert --a--, therefor.

Signed and Sealed this
First Day of August, 2023

Katherine Kelly Vidal
*Director of the United States Patent and Trademark Office*